(12) United States Patent
Gharib et al.

(10) Patent No.: US 8,456,645 B2
(45) Date of Patent: *Jun. 4, 2013

(54) METHOD AND SYSTEM FOR FAST THREE-DIMENSIONAL IMAGING USING DEFOCUSING AND FEATURE RECOGNITION

(75) Inventors: Morteza Gharib, Altadena, CA (US); Emilio Graff, Altadena, CA (US); Francisco Pereira, Rome (IT)

(73) Assignee: California Institute of Technology, Pasadena, CA (US)

(*) Notice: Subject to any disclaimer, the term of this patent is extended or adjusted under 35 U.S.C. 154(b) by 0 days.
This patent is subject to a terminal disclaimer.

(21) Appl. No.: 13/309,482

(22) Filed: Dec. 1, 2011

(65) Prior Publication Data
US 2012/0076400 A1 Mar. 29, 2012
US 2013/0071010 A9 Mar. 21, 2013

Related U.S. Application Data

(63) Continuation of application No. 12/313,508, filed on Nov. 19, 2008, now Pat. No. 8,089,635, and a continuation-in-part of application No. 12/011,016, filed on Jan. 22, 2008, and a continuation-in-part of application No. 12/150,236, filed on Apr. 23, 2008.

(60) Provisional application No. 61/003,698, filed on Nov. 19, 2007, provisional application No. 60/881,776, filed on Jan. 22, 2007, provisional application No. 60/881,779, filed on Jan. 22, 2007, provisional application No. 60/881,762, filed on Jan. 22, 2007, provisional application No. 60/925,918, filed on Apr. 23, 2007, provisional application No. 60/926,010, filed on Apr. 23, 2007, provisional application No. 60/926,023, filed on Apr. 23, 2007.

(51) Int. Cl.
*G01B 11/24* (2006.01)
*G06K 9/34* (2006.01)

(52) U.S. Cl.
USPC .......................................... 356/601; 382/173

(58) Field of Classification Search
USPC .. 356/600–601, 614, 620, 622, 625; 382/255, 382/274, 275, 278, 284, 285, 203, 173; 348/46, 348/335, 208.14
See application file for complete search history.

(56) References Cited

U.S. PATENT DOCUMENTS 4,264,921 A 4/1981 Pennington et al.
4,727,471 A 2/1988 Driels et al.
(Continued)

FOREIGN PATENT DOCUMENTS

EP 1175106 A2 1/2002
GB 2242270 A 3/1991
(Continued)

OTHER PUBLICATIONS

Chang, N.L., Efficient Dense Correspondences using Temporally Encoded Light Patterns, IEEE, Oct. 12, 2003.
(Continued)

*Primary Examiner* — Sang Nguyen
(74) *Attorney, Agent, or Firm* — One LLP; Mark A. Stirrat

(57) ABSTRACT

Described is a method and system for fast three-dimensional imaging using defocusing and feature recognition is disclosed. The method comprises acts of capturing a plurality of defocused images of an object on a sensor, identifying segments of interest in each of the plurality of images using a feature recognition algorithm, and matching the segments with three-dimensional coordinates according to the positions of the images of the segments on the sensor to produce a three-dimensional position of each segment of interest. The disclosed imaging method is "aware" in that it uses a priori knowledge of a small number of object features to reduce computation time as compared with "dumb" methods known in the art which exhaustively calculate positions of a large number of marker points.

4 Claims, 5 Drawing Sheets

U.S. PATENT DOCUMENTS

| | | |
|---|---|---|
| 4,879,664 A | 11/1989 | Suyama et al. |
| 4,948,258 A | 8/1990 | Caimi |
| 5,018,854 A | 5/1991 | Rioux |
| 5,031,154 A | 7/1991 | Watanabe |
| 5,075,561 A | 12/1991 | Rioux |
| 5,168,327 A | 12/1992 | Yamawaki |
| 5,206,498 A | 4/1993 | Sensui |
| 5,216,695 A | 6/1993 | Ross et al. |
| 5,235,857 A | 8/1993 | Anderson |
| 5,270,795 A | 12/1993 | Blais |
| 5,351,078 A | 9/1994 | Lemelson |
| 5,373,151 A | 12/1994 | Eckel, Jr. et al. |
| 5,579,444 A | 11/1996 | Dalziel et al. |
| 5,604,344 A | 2/1997 | Finarov |
| 5,714,762 A | 2/1998 | Li et al. |
| 5,745,067 A | 4/1998 | Chou et al. |
| 5,864,359 A | 1/1999 | Kazakevich |
| 5,922,961 A | 7/1999 | Hsu et al. |
| 6,157,747 A | 12/2000 | Szeliski et al. |
| 6,229,913 B1 | 5/2001 | Nayar et al. |
| 6,229,959 B1 | 5/2001 | Suda et al. |
| 6,271,918 B2 | 8/2001 | Blais |
| 6,278,847 B1 | 8/2001 | Gharib et al. |
| 6,748,112 B1 | 6/2004 | Nguyen et al. |
| 6,750,904 B1 | 6/2004 | Lambert |
| 6,765,569 B2 | 7/2004 | Neumann et al. |
| 6,912,293 B1 | 6/2005 | Korobkin |
| 6,915,008 B2 | 7/2005 | Barman et al. |
| 6,943,349 B2 | 9/2005 | Adamec et al. |
| 6,955,656 B2 | 10/2005 | Bergheim et al. |
| 6,965,690 B2 | 11/2005 | Matsumoto |
| 7,006,132 B2 | 2/2006 | Pereira et al. |
| 7,171,054 B2 | 1/2007 | Fiete et al. |
| 7,236,622 B2 | 6/2007 | Chen et al. |
| 7,260,274 B2 | 8/2007 | Sawhney et al. |
| 7,271,377 B2 | 9/2007 | Mueller et al. |
| 7,340,077 B2 | 3/2008 | Gokturk et al. |
| 7,372,642 B2 | 5/2008 | Rohaly et al. |
| 7,423,666 B2 | 9/2008 | Sakakibara et al. |
| 7,496,226 B2 | 2/2009 | Negahdaripour et al. |
| 7,565,029 B2 | 7/2009 | Zhou et al. |
| 7,612,869 B2 | 11/2009 | Pereira et al. |
| 7,612,870 B2 | 11/2009 | Graff et al. |
| 7,668,388 B2 | 2/2010 | Bryll |
| 7,715,918 B2 | 5/2010 | Melvin |
| 7,747,151 B2 | 6/2010 | Kochi et al. |
| 7,819,591 B2 | 10/2010 | Rohaly et al. |
| 7,916,309 B2 | 3/2011 | Gharib et al. |
| 8,179,424 B2 | 5/2012 | Moller |
| 2003/0096210 A1 | 5/2003 | Rubbert et al. |
| 2003/0125719 A1 | 7/2003 | Furnish |
| 2003/0160970 A1 | 8/2003 | Basu et al. |
| 2003/0210407 A1 | 11/2003 | Xu |
| 2004/0136567 A1 | 7/2004 | Billinghurst et al. |
| 2004/0155975 A1 | 8/2004 | Hart et al. |
| 2005/0025116 A1 | 2/2005 | Chen et al. |
| 2006/0092314 A1 | 5/2006 | Silverstein et al. |
| 2006/0098872 A1 | 5/2006 | Seo et al. |
| 2006/0209193 A1 | 9/2006 | Pereira et al. |
| 2006/0285741 A1 | 12/2006 | Subbarao |
| 2007/0008312 A1 | 1/2007 | Zhou et al. |
| 2007/0056768 A1 | 3/2007 | Hsieh et al. |
| 2007/0076090 A1 | 4/2007 | Alexander |
| 2007/0078500 A1 | 4/2007 | Ryan et al. |
| 2007/0103460 A1 | 5/2007 | Zhang et al. |
| 2007/0146700 A1 | 6/2007 | Kowarz et al. |
| 2007/0188769 A1 | 8/2007 | Rohaly et al. |
| 2007/0195162 A1 | 8/2007 | Graff et al. |
| 2007/0236694 A1 | 10/2007 | Gharib et al. |
| 2008/0031513 A1 | 2/2008 | Hart |
| 2008/0091691 A1 | 4/2008 | Tsuji |
| 2008/0180436 A1 | 7/2008 | Kraver |
| 2008/0239316 A1 | 10/2008 | Gharib et al. |
| 2008/0259354 A1 | 10/2008 | Gharib et al. |
| 2008/0278804 A1 | 11/2008 | Gharib et al. |
| 2009/0129667 A1 | 5/2009 | Ho et al. |
| 2009/0238449 A1 | 9/2009 | Zhang et al. |
| 2009/0295908 A1 | 12/2009 | Gharib et al. |
| 2010/0007718 A1 | 1/2010 | Rohaly, Jr. et al. |
| 2011/0074932 A1 | 3/2011 | Gharib et al. |

FOREIGN PATENT DOCUMENTS

| | | |
|---|---|---|
| JP | 2655885 B2 | 9/1997 |
| JP | 2001-16610 A | 8/2002 |
| JP | 2001-61165 A | 9/2002 |
| JP | 2003-289293 A | 10/2003 |
| JP | 2004-191240 A | 7/2004 |
| WO | WO 88/00710 A1 | 1/1988 |
| WO | WO 96/41304 A1 | 12/1996 |
| WO | WO 00/69357 A1 | 11/2000 |
| WO | WO 01/86281 A1 | 11/2001 |
| WO | WO 02/096478 A2 | 12/2002 |
| WO | WO 2006/009786 A2 | 1/2006 |
| WO | WO 2007/041542 A2 | 4/2007 |
| WO | WO 2007/056768 A2 | 5/2007 |
| WO | WO 2007/095307 A1 | 8/2007 |
| WO | WO 2007/130122 A2 | 11/2007 |
| WO | WO 2008/091691 A1 | 7/2008 |

OTHER PUBLICATIONS

Dellaert, F. et al., Structure from Motion without Correspondence, Computer Vision & Pattern Recognition, 2000.

El-Hakim S.F. et al., A System for Indoor 3-D Mapping and Virtual Environments, Proceedings of the SPIE, 1997.

Favaro, P. et al., Observing Shape from Defocused Images, Int'l Journal of Computer Vision, 52(1), 25-43, 2003.

Guarnieri, A et al., 3D Modeling of Real Artistic Objects with Limited Computers Resources, Proc. of XVIII CIPA Symposium on Architectural & Archaeological Photogrammetry, Oct. 1999.

Horn, E. et al., Toward Optimal Structured Light Patterns, 3DIM, 1997.

Koninckx, T.P. et al., A Graph Cut based Adaptive Structured Light approach for real-time Range Acquisition, 3EDPVT, 2004.

Kordelas, G. et al., State-of-the-art Algorithms for Complete 3D Model Recoonstruction, "Engage" Summer School, 2010.

Levenberg, K., A Method for the Solution of Certain Non-Linear Problems in Least Squares, Quarterly of Applied Mathematics, vol. II, No. 2, Jul. 1944.

Li, S.Z., Markov Random Field Models in Computer Vision, Springer-Verlag, 1995.

Lowe, D.G., Three-Dimensional Object Recognition from Single Two-Dimensional Images, Artificial Intelligence, 31, 3, Mar. 1987, pp. 355-395.

Lowe, D.G., Object Recognition from Local Scale-Invariant Features, Proc. of the Int'l Conference on Computer Vision, Sep. 1999.

Makadia, A. et al., Fully Automatic Registration of 3D Point Clouds, Proceedings of the 2006 IEEE Computer Society Conference on Computer Vision and Pattern Recognition, 2006.

Marquardt, D.W., An Algorithm for Least-Squares Estimation of Nonlinear Parameters, Journal of the Society for Industrial and Applied Mathematics, vol. 11, No. 2, Jun. 1963, pp. 431-441.

Mouaddib, E et al., Recent Progress in Structured Light in order to Solve the Correspondence Problem in Stereo Vision, Proceedings of the 1997 IEEE, Apr. 1997.

Neugebauer, P.J., Geometrical Cloning of 3D Objects via Simultaneous Registration of Multiple Range Images, Shape Modeling & Application, Mar. 1997.

Nguyen V.A. et al., Detection of the depth order of defocused images, Vision Research 45, 2005, pp. 1003-1011.

Pages, J. et al., Implementation of a Robust Coded Structured Light Technique for Dynamic 3D Measurements, ICIP, 2003.

Pereira, F. et al., Two-frame 3D particle tracking, Measurement Science and Technology 17, 2006, pp. 1680-1692.

Raij, A. et al., PixelFlex2: A Comprehensive, Automatic, Casually-Aligned Multi-Projector Display, PROCAMS, 2003.

Raskar, R. et al., Multi-Projector Displays Using Camera-Based Registration, IEEE Visualization, 1999.

Rocchini, C. et al., A low cost 3D scanner based on structured light, Computer Graphics Forum (Eurographics 2001 Conf. Issue).

Rusinkiewicz, S. et al., Real-Tiime 3D Model Acquisition, ACM Transactions on Graphics, 2002.

Salvi, J. et al., Pattern codification strategies in structured light systems, Pattern Recognition, 2004.

Scharstein, D. et al., A Taxonomy and Evaluation of Dense Two-Frame Stereo Correspondence Algorithms, IJCV, 2002.

Scharstein, D. et al., High-Accuracy Stereo Depth Maps Using Structured Light, IEEE Computer Society Conf. on Computer Vision and Pattern Recognition, 2003, vol. 1, pp. 195-202.

Sinofsky, Measurement of Laser Beam Spreading in Biological Tissue Scattering, SPIE vol. 712, Lasers in Medicine (1986).

Smith, E.R. et al., Registration of combined range-intensity scans: Initialization through verification, Computer Vision and Image Understanding 110, 2008, pp. 226-244.

Subbarao, M. et al., Analysis of Defocused Image Data for 3D Shape Recovery using a Regularization Technique, SPIE, 1997.

Tardif, J. Multi-projectors for arbitrary surfaces without explicit calibration and reconstruction, DIM, 2003.

Tardif, J. et al., A MRF formulation for coded structured light, Proceedings of the 5th Intl Conf. on 3-D Digital Imaging & Modeling, 2005.

Wang, Z. et al., Extraction of the Corner of Checkerboard image, Proceedings of the 7th World Congress on Intelligent Control and Automation, Jun. 25-27, 2008.

Weisstein, E., Gray Code, http://mathworld.wolfram.com/GrayCode.html.

Willert, C.E. et al., Three-dimensional particle imaging with a single camera, Experiments in Fluids 12, 1992, pp. 353-358.

Williams, J.A. et al., Multiple View 3D Registration: A Review and a New Technique, Systems Man. & Cybernetics 10, 1999.

Wu, M. et al., Three-dimensional fluorescent particle tracking at micron-scale using a single camera, Experiments in Fluids, 2005, pp. 461-465.

Yang, R. et al., PixelFlex: A Reconfigurable Multi-Projector Display System, IEEE Visualization, 2001.

Zhang, S. et al., High-resolution, Real-time 3D Shape Acquisition, IEEE Workshop of real-tiime 3D sensors & their uses, 2004.

PCT/US2008/000991, International Search Report/Written Opinion, Jul. 28, 2009.

PCT/US2008/000882, International Preliminary Report on Patentability, Aug. 6, 2009.

PCT/US2008/000882, International Search Report, Jul. 5, 2009.

PCT/US2008/005313, International Preliminary Report on Patentability/Written Opinion, Oct. 27, 2009.

PCT/US2008/005314, International Preliminary Report on Patentability/Written Opinion, Oct. 27, 2009.

PCT/US2008/005315, International Preliminary Report on Patentability/Written Opinio, Oct. 27, 2009.

2008244494, Examiner's First Report, Aug. 18, 2010.

PCT/US2008/005311, International Preliminary Report on Patentability/Written Opinion, Oct. 27, 2009.

PCT/US2008/005314, International Search Report, Sep. 8, 2008.

PCT/US2008/000991, International Preliminary Report on Patentability, Jul. 31, 2008.

PCT/US2005/021326, International Search Report, Feb. 1, 2007.

PCT/US2009/004362, Search Report, May 27, 2010.

PCT/US2009/004362, Preliminary Report on Patentability/Written Opinion, May 27, 2010.

METHOD AND SYSTEM FOR FAST THREE-DIMENSIONAL IMAGING USING DEFOCUSING AND FEATURE RECOGNITION

CROSS-REFERENCE TO RELATED APPLICATIONS

The present application is a continuation of application Ser. No. 12/313,508 filed on Nov. 19, 2008 now U.S. Pat. No. 8,089,635, which claims the benefit of priority to U.S. provisional application No. 61/003,698 filed on Nov. 19, 2007. The present application is also a continuation-in-part of co-pending U.S. patent application Ser. No. 12/011,016, filed Jan. 22, 2008, which claims the benefit of priority to U.S. provisional application No. 60/881,779, filed Jan. 22, 2007, U.S. provisional application No. 60/881,762, filed Jan. 22, 2007, and U.S. provisional application No. 60/881,776, filed Jan. 22, 2007. The present application is also a continuation-in-part of co-pending U.S. patent application Ser. No. 12/150,236, filed Apr. 23, 2008, which claims the benefit of priority to U.S. provisional application 60/926,010, filed Apr. 23, 2007, U.S. provisional application No. 60/925,918, filed Apr. 23, 2007, and U.S. provisional application No. 60/926,023, filed Apr. 23, 2007.

BACKGROUND OF THE INVENTION (1) Field of Invention

The present invention relates to three-dimensional imaging and, more particularly, to a method and system for fast three-dimensional imaging using defocusing and feature recognition.

(2) Description of Related Art

The present invention relates to three-dimensional imaging. The various methods for imaging objects in three-dimensions can be divided into scanning methods and instantaneous methods. Scanning systems are generally suitable for imaging immobile objects. Scanning methods include laser scanning, ultrasound (tomography), magnetic resonance imaging (tomography), and confocal scanning microscopy. Instantaneous systems can be used to capture moving objects and thus analyze motion, such as in defocusing DPIV (Digital Particle Imaging Velocimetry). Other instantaneous methods include ultrasound, three-dimensional photogrammetry, correlation surface mapping, and time-of-flight systems.

Currently existing instantaneous imaging methods using defocusing involve imaging an object with markers applied to or projected onto the surface of an object, or using natural features or texture in the object to analyze its shape and location in space. These methods are "dumb" in that they are generalized (i.e., they do not inherently understand the object being imaged). This generalization leads to a system whose resolution is dependent on the number of points analyzed. As such, the processing time increases.

Thus, a continuing need exists for a method for fast three-dimensional imaging using defocusing which reduces processing time by incorporating a priori knowledge of the object being imaged.

SUMMARY OF INVENTION

The present invention relates to three-dimensional imaging and, more particularly, to a method and system for fast three-dimensional imaging using defocusing and feature recognition. A first aspect of the method comprises acts of capturing a plurality of defocused images of an object on a sensor, identifying segments of interest in each of the plurality of images using a feature recognition algorithm, and matching the segments with three-dimensional coordinates according to the positions of the images of the segments on the sensor. Thus, a three-dimensional position of each segment of interest is produced.

In another aspect, the images of the object are obtained by an instantaneous scanning method selected from the group consisting of defocusing, ultrasound, three-dimensional photogrammetry, correlation surface mapping, and time-of-flight methods.

Another aspect of the present invention is a data processing system comprising a sensor for capturing a plurality of defocused images of an object substantially simultaneously. The system also includes one or more processors configured to receive a plurality of defocused images of an object captured on the sensor, identify segments of interest in each of the plurality of images using a feature recognition algorithm, and match the segments with three-dimensional coordinates according to the positions of the images of the segments on the sensor.

In another aspect, the data processing system further comprises a camera having a lens obstructed by a mask with a plurality of off-axis apertures. The sensor is configured to capture a plurality of defocused images of an object by receiving a signal transmitted by the object through the plurality of off-axis apertures and through the lens.

In yet another aspect, the data processing system is further configured to ascertain sub-pixel positions of the segment positions on the sensor using a cross-correlation type algorithm.

As can be appreciated by one skilled in the art, an additional aspect of the present invention is computer program product. The computer program product comprises computer-readable instruction means stored on a computer-readable medium that are executable by a computer for causing the computer to receive a plurality of defocused images of an object on a sensor, identify segments of interest in each of the plurality of images using a feature recognition algorithm, and match the segments with three-dimensional coordinates according to the positions of the images of the segments on the sensor.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figures 1A, 1B:
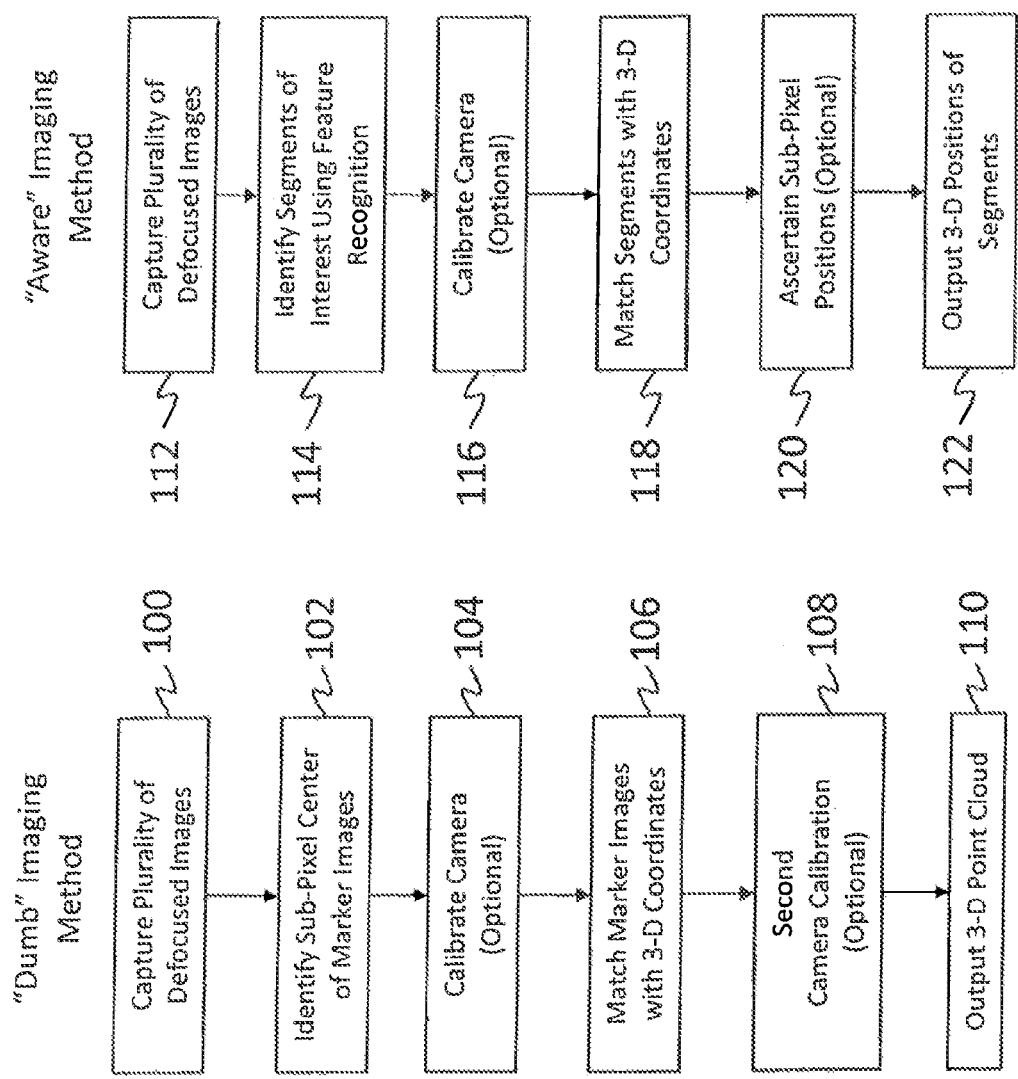
FIG. 1A is a flow diagram showing the acts of a "dumb" imaging method as currently exists in the art.
FIG. 1B is a flow diagram showing the acts of an "aware" imaging method of the present invention.

The present invention relates to three-dimensional imaging and, more particularly, to a method and system for fast three-dimensional imaging using defocusing and feature recognition. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is only one example of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Further, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

(1) Description

The present invention relates to three-dimensional imaging and, more particularly, to a method and system for fast three-dimensional imaging using defocusing and feature recognition. The concept of defocusing is known in the art and was first introduced by Willert, C.E. and Gharib, M. in *Three-dimensional particle imaging with a single camera*, Experiments in Fluids 12, 353-358 (1992), which is incorporated by reference as though fully set forth herein.

Currently existing instantaneous imaging methods using defocusing involve imaging an object with markers applied to or projected onto the surface of an object, or using natural features or texture in the object to analyze its shape and location is space. These methods are "dumb" in that they are generalized (i.e., they do not inherently understand the object being imaged). This generalization leads to a system whose resolution is dependent on the number of points analyzed.

Figure 2:
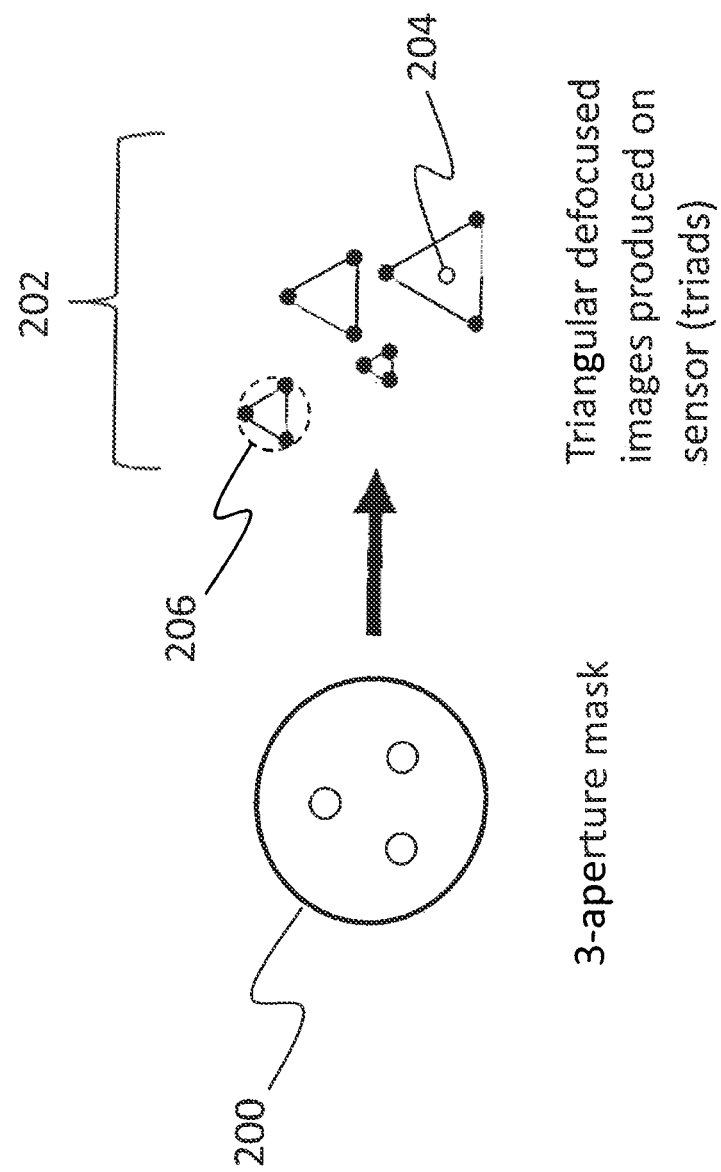
FIG. 2 is an illustration of a 3-aperture camera mask for use with the present invention, and groups of defocused images produced by such a mask.
Figure 3:
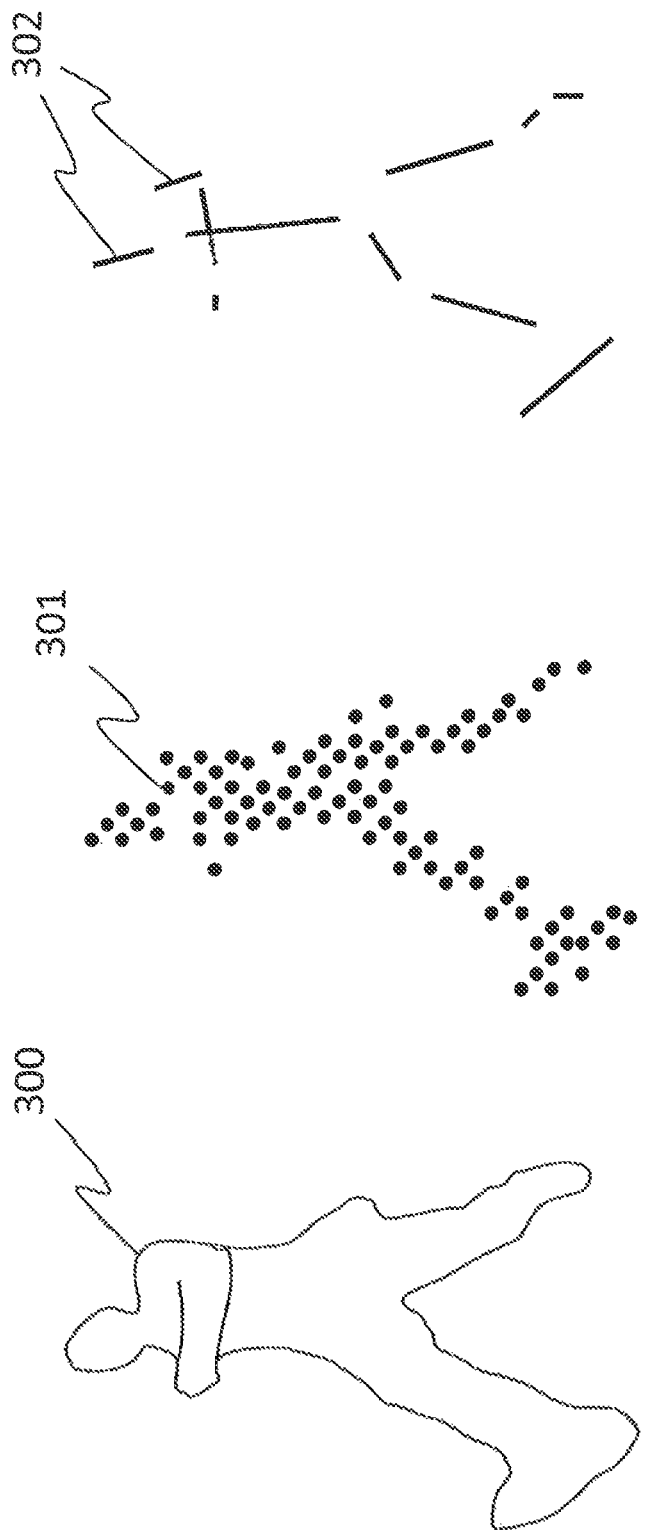
FIG. 3A is an illustration showing an outline of a person from an input image.
FIG. 3B is an illustration showing a point cloud representing a person, as output by a "dumb" imaging method.
FIG. 3C is an illustration showing segments of interest corresponding to a person as output by the "aware" imaging method of the present invention.

FIG. 1A is a flow diagram illustrating a "dumb" method for three-dimensional imaging as currently exists in the art. The "dumb" method is initiated by capturing a plurality of defocused images 100 of an object. The object contains a set of either natural or projected marker points. The pixel or sub-pixel centers are then identified 102 for each marker point in the plurality of images. For example, FIG. 2 shows an example of a plurality of defocused marker images produced by an imager with a 3-aperture mask 200, resulting in a triangular arrangement of defocused images 202, or "triads," corresponding to each feature or marker on the target object. Determining a sub-pixel center 204 of each triad will yield the x and y-coordinates of that marker point on the object. At this time, the camera may be optionally calibrated 104 (in FIG. 1A) to account for lens distortions, assembly precision, and experimental setup in preparation for matching the marker images with their z-coordinates (three-dimensional coordinates) 106. The physical size of the triangle 206 (in FIG. 2) produced (in FIG. 2) by the triad will yield the z, or depth coordinate of the marker point. The depth coordinate can be generated through use of defocusing equations known in the art, a non-limiting example of which was published by Willert, C.E. and Gharib, M. in *Three-dimensional particle imaging with a single camera*, Experiments in Fluids 12, 353-358 (1992), which is incorporated by reference as though fully set forth herein. Referring again to FIG. 1A, after matching the marker images with three-dimensional coordinates 106, a second optional camera calibration may be performed 108. The end result of the "dumb" method is the output of a three-dimensional point cloud 110 representing the three-dimensional shape of the object. For illustration purposes only, an outline of a person 300 from an input image is illustrated in FIG. 3A. An illustration of a point cloud 301 produced by a "dumb" method is illustrated in FIG. 3B.

The present invention is a method which uses a priori knowledge about the object being imaged prior to performing the three-dimensional measurement. Such an "aware" system has application to situations where the object to be imaged is well known and the basic parameters of the three-dimensional position, orientation, and movement of the object is required quickly. FIG. 1B is a flow diagram showing the acts of the "aware" imaging method of the present invention. The first act is capturing a plurality of defocused images of an object on a sensor 112. The images captured are not limited to visual images, as the defocusing techniques of the present invention are also applicable to acoustics. A non-limiting example of how the defocusing can be achieved is by a camera having a lens obscured by a mask with a plurality of off-axis apertures. For example, FIG. 2 shows a defocusing mask containing three off-axis apertures 200 arranged in a triangular shape. But, it should be understood that the present invention can utilize any of a wide variety of defocusing masks and camera assemblies, including but not limited to those described in U.S. patent application Ser. No. 12/011,023, filed Jan. 22, 2008, entitled "METHOD AND APPARATUS FOR QUANTITATIVE 3-D IMAGING;" U.S. patent application Ser. No. 12/011,016, filed Jan. 22, 2008, entitled "METHOD AND APPARATUS FOR QUANTITATIVE 3-D IMAGING;" U.S. patent application Ser. No. 12/150,237, filed on Apr. 23, 2008, entitled "SINGLE-LENS, SINGLE-APERTURE, SINGLE-SENSOR 3-D IMAGING DEVICE;" U.S. patent application Ser. No. 12/150,238, filed on Apr. 23, 2008, entitled "SINGLE LENS 3D IMAGING DEVICE USING A POLARIZATION-CODED APERTURE MASK COMBINED WITH A POLARIZATION-SENSITIVE SENSOR;" U.S. patent application Ser. No. 12/150,239, filed on Apr. 23, 2008, entitled "APERTURE SYSTEM WITH SPA- TIALLY-BIASED APERTURE SHAPES AND POSITIONS (SBPSP) FOR STATIC AND DYNAMIC 3-D DEFOCUSING-BASED IMAGING;" and U.S. patent application Ser. No. 12/150,236, filed on Apr. 23, 2008, entitled "SINGLE-LENS, SINGLE-SENSOR 3-D IMAGING DEVICE WITH A CENTRAL APERTURE FOR OBTAINING CAMERA POSITION;" all of which are incorporated by reference as though fully set forth herein. In such camera assemblies, the sensor is configured to capture the plurality of defocused images of the object by receiving a signal transmitted from the object through the plurality of off-axis apertures and through the lens of the camera. The term "signal" is meant to encompass both electromagnetic radiation and sound waves. The term "transmitted from an object" is meant to encompass both reflection and emission of the signal from the object. Non limiting examples of transmission by emission include, but are not limited to, radiation from a light bulb or from an object undergoing radioactive decay. Non-limiting examples of transmission by reflection include, but are not limited to, reflection of light off of an object from a light bulb or from a laser. The result of the defocusing is to produce a plurality of defocused images 202 on the sensor.

Referring again to FIG. 1B, the next act is to identify segments of interest in the plurality of defocused images using a feature recognition algorithm 114. Such an "aware" imaging method searches for a small number of a priori known features in the images. The segments of interest searched for will depend on the type of object being viewed. FIG. 3C shows examples of segments of interest 302 used in human feature recognition. The present invention can use any feature recognition algorithm know in the art to find the segments of interest.

In a next act, as with the "dumb" imaging method, the camera can be optionally calibrated 116 (in FIG. 1B) to account for lens distortions, assembly precision, and experimental setup. The feature segments are then matched with their three-dimensional coordinates 118 based on the position of the images of the segments of interest on the sensor. As with the "dumb" method and as illustrated in FIG. 2, if a 3-aperture mask 200 is used, the defocused images that are produced will form triads 202. The position of the center of the triad 204 on the sensor gives the x and y locations of the segment in the image. As noted before, the physical size of the triad 206 gives the z coordinate through the use of defocusing equations first described by Willert, C.E. and Gharib, M. in *Three-dimensional particle imaging with a single camera*, Experiments in Fluids 12, 353-358 (1992). The physical size of the triad can be represented as any of a variety of measurements including but not limited to the area of the triad, the circumference of the triad, the distance from a center point to any vertex of the triad, or the circumference of a circle encompassing and tangent with the vertices of the triad. Prior to outputting the three-dimensional positions of the segments of interest 122 (in FIG. 113), if desired, greater precision can be obtained by ascertaining sub-pixel positions 120 of the segments of interest using a cross-correlation type algorithm. The end result of the "aware" imaging method, as shown in FIG. 3C, is an image containing three-dimensional locations of the segments of interest 302.

Figure 4:
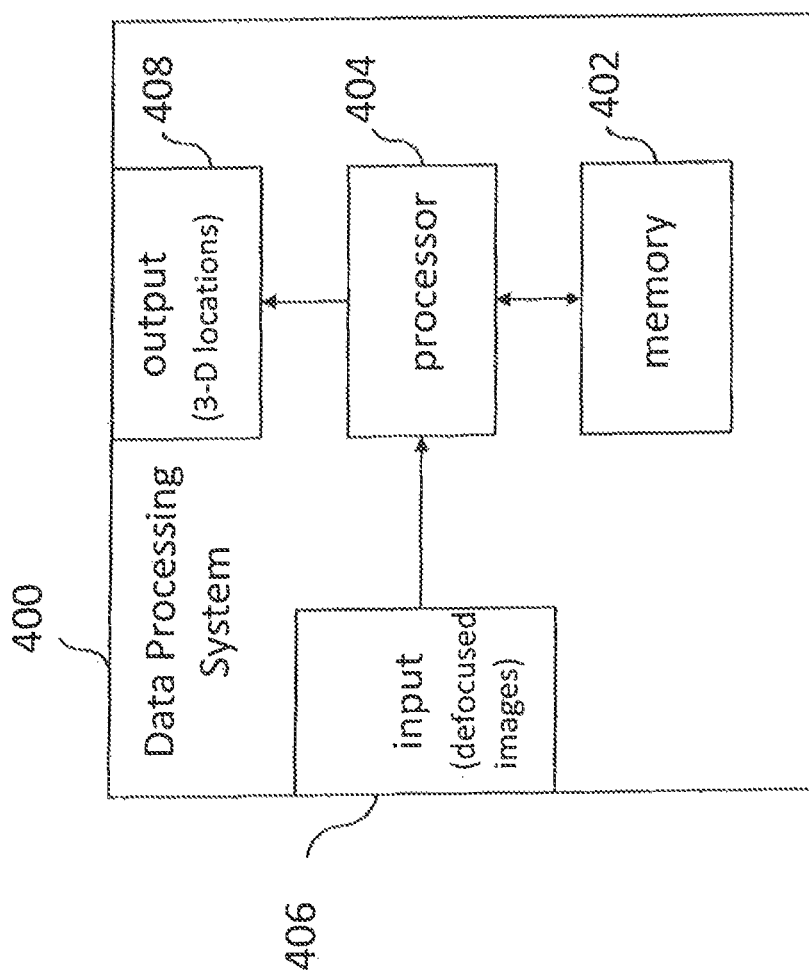
FIG. 4 is a block diagram showing a generic data processing system for use with the present invention.

FIG. 4 is a block diagram showing a generic data processing system for use with the present invention. The data processing system 400 comprises a memory 402 and a processor 404 (or a plurality of processors). The processor(s) 404 is configured to receive a defocused image input 406 and output three-dimensional locations of the segments of interest 408. The system is further configured to perform the acts of the method of the present invention, including: capturing a plurality of defocused images of an object on a sensor, identifying segments of interest in each of the plurality of images using a feature recognition algorithm, and matching the segments with three-dimensional coordinates according to the positions of the images of the segments on the sensor to produce a three-dimensional position of each segment of interest.

Figure 5:
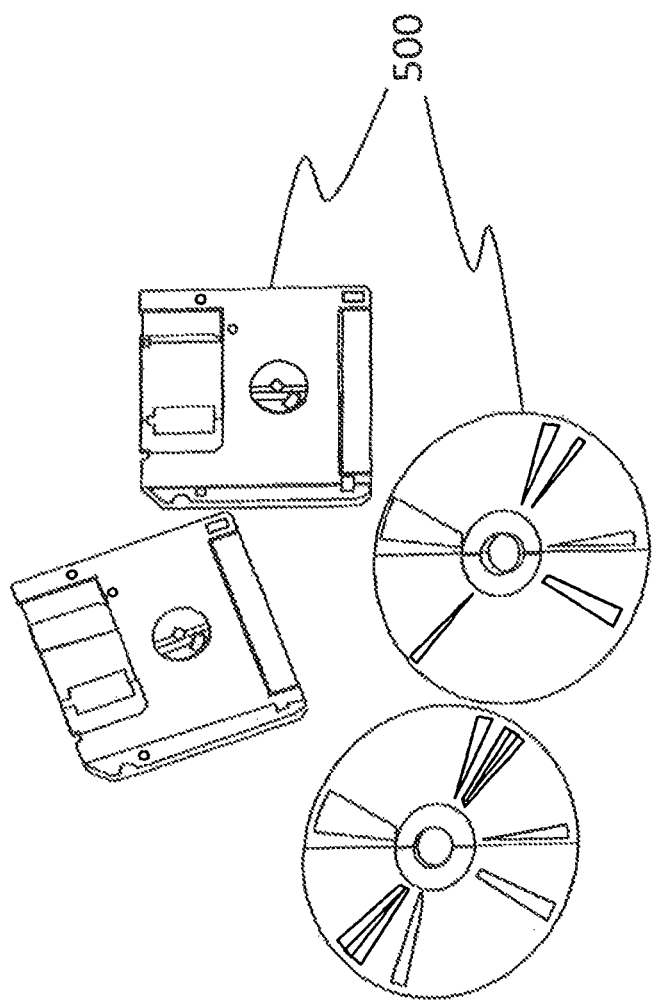
FIG. 5 is an illustration showing a computer program product for use with the present invention.

Finally and as illustrated in FIG. 5, the present invention also comprises a computer program product 500. The computer program product 500 comprises computer readable instruction means encoded thereon for causing the data processing system to perform the operations described herein. The term "instruction means" as used with respect to this invention generally indicates a set of operations to be performed on a computer (or computers), and may represent pieces of a whole program or individual, separable, software modules. Non-limiting examples of "instruction means" include computer program code (source or object code) and "hard-coded" electronics (i.e. computer operations coded into a computer chip). The "instruction means" may be stored in the memory of a computer or on a computer-readable medium such as a floppy disk, a CD-ROM, and a flash drive. The computer program product 500 shown in FIG. 5 is an optical disk such as a CD or DVD. However, the computer program product 500 generally represents computer-readable instructions stored on any compatible computer-readable medium.

The invention claimed is:

1. A method for fast three-dimensional imaging using defocusing and feature recognition in a fast three-dimensional imaging data processing system having a sensor and a processor, comprising:
    capturing a plurality of defocused images of an object on the sensor by receiving signals transmitted from the object through a plurality of apertures of a mask and through a lens, where the data processing system understands the type of object being imaged;
    using the data processing system to identify a priori known segments of interest in each of the plurality of defocused images with a feature recognition algorithm; and
    using the data processing system to match the identified a priori known segments of interest with three-dimensional coordinates according to the positions of the images of the segments on the sensor to produce an output image containing the three-dimensional position of each segment of interest.

2. The method of claim 1, further comprising ascertaining sub-pixel positions of the a priori known segments of interest using a cross-correlation type algorithm.

3. A data processing system for fast three-dimensional imaging using defocusing and feature recognition, comprising:
    a mask having a plurality of apertures;
    a lens;
    a sensor configured to capture a plurality of defocused images of an object substantially simultaneously, by receipt of signals transmitted from the object through the plurality of apertures and through the lens, wherein the data processing system understands the type of object being imaged; and
    one or more processors configured to identify a priori known segments of interest in each of the plurality of defocused images with a feature recognition algorithm, and configured to match the identified a priori known segments of interest with three-dimensional coordinates, according to the positions of the images of the segments of interest on the sensor, to produce an output image containing the three-dimensional position of each segment of interest.

4. The data processing system of claim 3, wherein the one or more processors are further configured to ascertain sub-pixel positions of the a priori known segments of interest on the sensor using a cross-correlation type algorithm.

* * * * *